United States Patent [19]

Koch

[11] 4,080,013
[45] Mar. 21, 1978

[54] SEALED SELF-ALIGNING SPHERICAL BUSHING

[75] Inventor: Hans W. Koch, Levittown, Pa.

[73] Assignee: Roller Bearing Company of America, West Trenton, N.J.

[21] Appl. No.: 755,444

[22] Filed: Dec. 29, 1976

[51] Int. Cl.² .............................................. F16C 33/72
[52] U.S. Cl. .................................... 308/36.1; 277/94; 308/72
[58] Field of Search ................... 308/36.1, 36.2, 36.3, 308/36.4, 36.5, 72, 187.1, 187.2, 187; 277/94, 169, 30, 212 FB, 182–184

[56] References Cited

U.S. PATENT DOCUMENTS

| | | | |
|---|---|---|---|
| 3,145,996 | 8/1964 | Ninos et al. | 277/169 |
| 3,588,201 | 6/1971 | Schmidt | 308/36.1 |
| 3,989,259 | 11/1976 | Lorenz et al. | 277/182 X |

Primary Examiner—Trygve M. Blix
Assistant Examiner—Douglas C. Butler
Attorney, Agent, or Firm—Zachary T. Wobensmith, 2nd; Zachary T. Wobensmith, III

[57] ABSTRACT

A self-aligning spherical bushing whose spherical mating surfaces are protected by a seal of unique construction which keeps out water, dust, dirt, etc. but freely permits the bearing to have a wide range of movement.

7 Claims, 4 Drawing Figures

U.S. Patent March 21, 1978 4,080,013
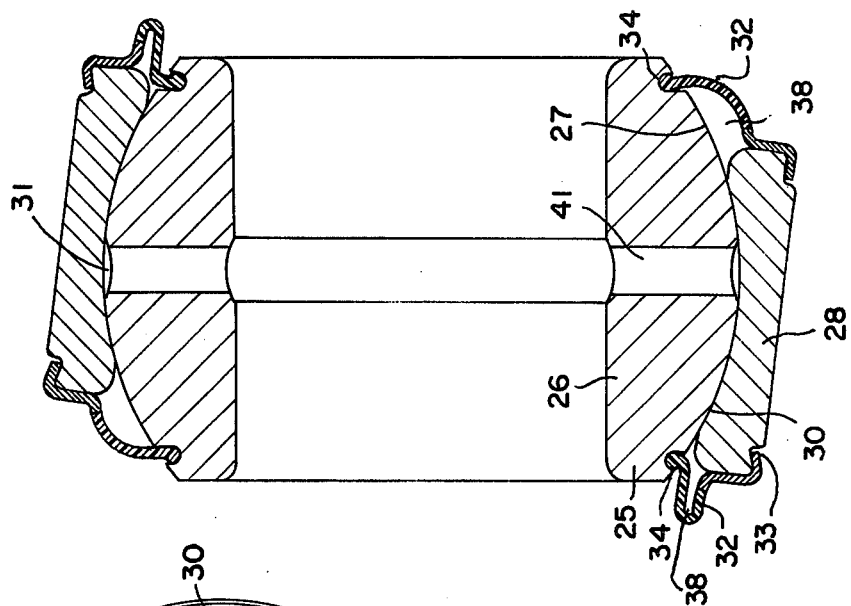
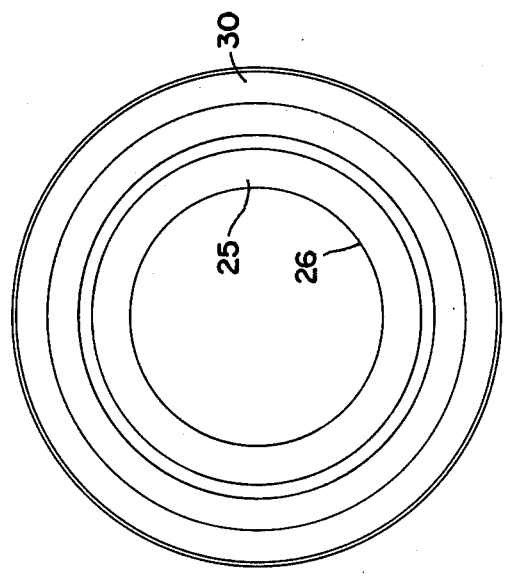
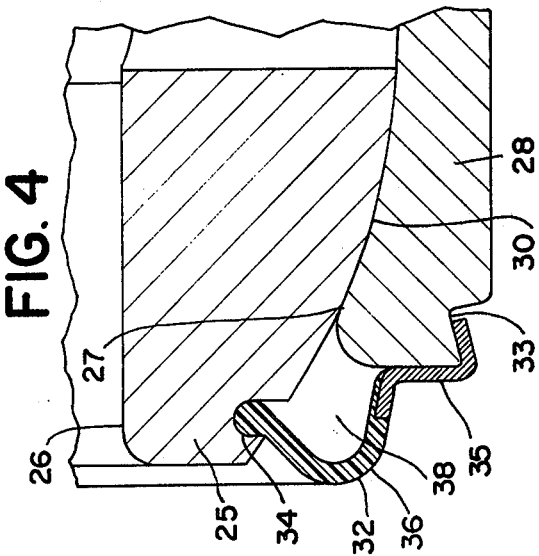
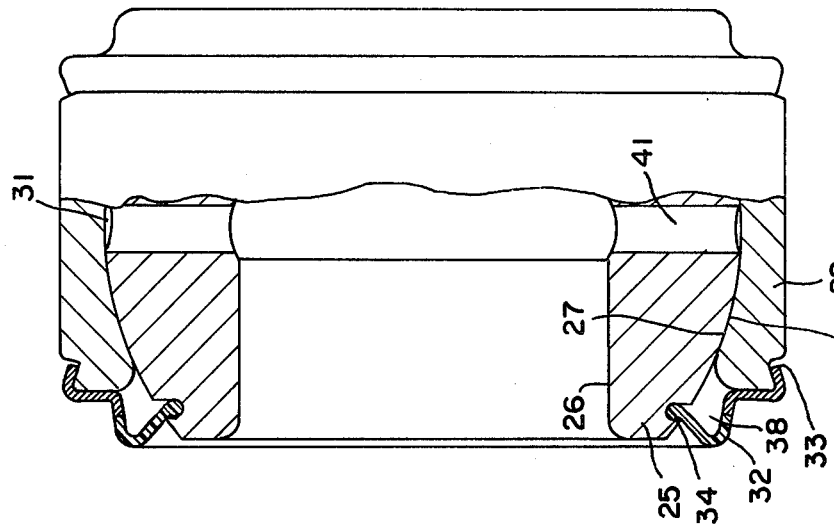

SEALED SELF-ALIGNING SPHERICAL BUSHING

DESCRIPTION OF THE INVENTION

Existing self-aligning plain bushings have a spherical inner bearing surface which is relatively wide compared to the spherical outer bearing surface and in any position between the extremes have a relatively wide inner spherical bearing surface surmounting a relatively narrow spherical outer bearing surface. The portion of the spherical inner bearing surface unprotected on the ends is vulnerable to dirt, dust, moisture, etc. This is also true of most sealed self-aligning spherical plain bushings, since the seal forms a radial plane at both ends of the outer bearing surface. It only seals the part of the inner race bearing surface which is protected by the spherical outer bearing surface.

For a better understanding of this statement attention is called U.S. Pat. Nos. 3,848,938 by Leo Stella of the Torrington Company and 3,588,201 by Heinrich K. Schmidt of Roller Bearing Company of America. These patents and others suggest the idea of preventing dirt and other foreign particles from entering the bearing and at the same time retain lubricant between the spherical faces in contact with one another. Seals of this nature, however, have a wiping action. In other words, when the inner bearing surface misaligns to either side, the seal which is in close contact with the spherical surface of the inner bearing wipes off dirt and other foreign matter when the misalignment motion of the inner bearing surface is in a direction toward the seal from the outside. This wiping, however, does not only remove the dirt but also removes each time some of the lubricant on the spherical surface of the inner member.

Another disadvantage of the above prior seals is that because of their contour and mounting position they do not provide sufficient room inside the bushing for any lubricant storage. Lubricant between the spherical surfaces in the load area of the bushing is usually removed by the action of the bushing and not replaced except at relubrication of the bushing which in most cases must be frequent, or the life of the bushing is drastically reduced.

An object of the invention is to have a seal which encloses the total spherical surface of the inner bearing.

A further purpose is to provide sufficient lubricant storage.

A further purpose is to prevent dirt and any other foreign particles from entering the bushing.

A further purpose is to provide a structure flexible enough for misalignment action.

A further purpose is to provide a structure rigid enough to overcome some of the rotational drag on the seal, and provide a spherical self-aligning plain bushing with high load capacity which does not require any additional maintenance after installation. In other words, the invention will provide a spherical plain bushing which has been lubricated for its entire life.

In the drawings I have provided the following:

FIG. 1 is a half section of my improved bushing.

FIG. 2 is an elevational view of FIG. 1 from one end.

FIG. 3 is a section of the bushing misaligned to the right.

FIG. 4 is an enlarged sectional view, broken away, of a slightly variant form of the same embodiment, shown more or less the same way as in FIG. 1.

In the drawings the inside of the seal is lodged with a slight interference in a groove of the spherical outside diameter of the inner bearing surface. This seal is shown in FIG. 1 in neutral position and the interference between seal inner diameter and groove diameter is such that a slight drag exists when relative rotational oscillatory motion between the spherical inner bearing surface and the spherical outer bearing surface takes place. This slight drag will be sufficient to result in a light twisting of the elastic parts of the seal and thereby generate a pumping action in the lubricant-filled void.

In FIG. 3 there is a misaligned position shown. The stretching and folding of the flexible seal part during misalignment results again in moving the lubricant by pumping action.

There are several functions performed in this device. The first is protecting the total spherical surface of inner and outer bearing surface in neutral as well as in misaligned position from dirt, dust, moisture and other foreign matter harmful to the smooth operation of the bushing. The second function performed by the bushing is retaining lubricant inside the bushing since no wiping action occurs.

Because the stretching, folding and twisting action of the flexible seal results in a pumping action which agitates the lubricant and moves it within the bushing, the spherical surface remains lubricated. The seal is an integral part of the bushing assembly and the bushing with the seal and lubricant is furnished as a complete unit.

Describing the drawings specifically in illustration and not in limitation, the inner member 25 has an internal portion which is preferably cylindrical so that the bearing can be mounted on a shaft. The outer portion 27 is spherical.

The bearing has a cooperating outer member 28 which has a mating spherical surface 30 which cooperates with the outer surface 27 of the inner member, although in the center of that outer spherical surface of the inner member there is an oil groove 31, or at least an oil hole, and to that extent the surface is not exactly spherical over its entire extent.

The seals 32 provided at the sides have for their use in the outer member at the outside a groove 33 in that outer member continuously extending around each of its sides and in the inner member at the inside of the seals a groove 34 in the inner member extending completely around the inner member.

In describing the invention I realize that the dimensions and proportions are subject to change.

At the outside the member is preferably of steel 35, at the inside it is preferably of some form of elastomeric or synthetic rubber 36 which will give the necessary flexibility, and the two are bonded together in the middle, with considerable overlap, as shown especially in FIG. 4. The bulbous end of the seal goes into groove 34 as likewise shown in the drawings. There is considerable area within the seal for holding lubricant, as shown at 38.

Groove 31 runs in annular fashion around the spherical outside surface of the inner bearing member.

In the inner bearing an oil passage 41 communicating with that groove can be provided for use in case of unforeseen loss of lubricant in the bearing, or desire to change the kind of lubricant used. This oil passage extends from an inner annular groove, and the setup thus makes possible intercommunication with other such grooves and passages in an inner shaft (not shown) for putting in the lubricant.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A sealed self-aligning spherical bushing consisting of
    an inner member having an outer bearing surface which is spherical,
    an outer member having an inner bearing surface which is spherical and cooperates with the spherical surface of the inner member and an outer peripheral surface,
    a seal on each side having an outside end and an inside end,
    the outer member having at each end an annular groove on the outer peripherial surface providing a recess engaging the outside ends respectively of each of said seals,
    the inner member having an annular groove near each end of the spherical outer surface to accommodate the inside ends respectively of each off of said seals,
    said seals having a flexibility so as to engage the ends of the outer member and the inner member in their respective grooves, thereby totally sealing the spherical surfaces of the inner and outer member during all modes of operation.

2. The bushing of claim 1, in which the seal consists of a combination of metal and elastomeric or synthetic rubber.

3. The bushing of claim 1, in which the seal consists of metal near the ends of the outer bearing surface and elastomeric or synthetic rubber near the inner bearing surface and a bond between.

4. The bushing of claim 1, in which the outer bearing surface of the inner bearing face is larger than the inner bearing surface of the seal.

5. A sealed self-aligning spherical bushing consisting of
    an inner bearing member having an outer bearing surface which is spherical,
    an outer bearing member having an inner bearing surface which is spherical and cooperates with the spherical bearing surface of the inner member, and an outer peripheral surface, and
    a seal having an outside end and an inside end,
    said seal being in engagement at at least one end of the outer surface of the inner member and an inside end surface of the outer member,
    the outer member having at at least that end an annular groove on the outer peripheral surface providing a recess engaging the outside end of the seal,
    the inner member having an annular groove near at least that end on the spherical outer surface to accommodate the inside end of the seal,
    said seal having a flexibility so as to engage the outer member and the inner member in their respective grooves, thereby totally sealing the spherical surfaces of the inner and outer member during all modes of operation at at least that end.

6. The bushing of claim 5, in which the seal consists of a combination of metal and elastomeric or synthetic rubber.

7. The bushing of claim 6, in which the seal consists of metal near at least that end of the inner surface of the outer bearing member and elastomeric or synthetic rubber near the outer surface of the inner bearing member and a bond between.

* * * * *

UNITED STATES PATENT OFFICE
CERTIFICATE OF CORRECTION

Patent No. 4,080,013　　　　　　　　　Dated March 21, 1978

Inventor(s) Hans W. Koch

It is certified that error appears in the above-identified patent and that said Letters Patent are hereby corrected as shown below:

Column 3,

Claim 1, line 25, after "each", delete "off"

Signed and Sealed this

Eighteenth Day of July 1978

[SEAL]

Attest:

RUTH C. MASON
*Attesting Officer*

DONALD W. BANNER
*Commissioner of Patents and Trademarks*